(12) United States Patent
Salter et al.

(10) Patent No.: US 12,236,819 B1
(45) Date of Patent: Feb. 25, 2025

(54) AUGMENTING A PHYSICAL WRITING SURFACE

(71) Applicant: Apple Inc., Cupertino, CA (US)

(72) Inventors: Thomas G. Salter, Foster City, CA (US); Anshu Kameswar Chimalamarri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/682,681

(22) Filed: Feb. 28, 2022

Related U.S. Application Data

(60) Provisional application No. 63/155,527, filed on Mar. 2, 2021.

(51) Int. Cl.
  *G09G 3/00* (2006.01)
  *G06Q 10/1093* (2023.01)
  *G09G 5/12* (2006.01)

(52) U.S. Cl.
  CPC ......... *G09G 3/008* (2013.01); *G06Q 10/1093* (2013.01); *G09G 5/12* (2013.01)

(58) Field of Classification Search
  CPC ....... G09G 3/008; G09G 5/12; G06Q 10/1093
  See application file for complete search history.

(56) References Cited

U.S. PATENT DOCUMENTS

| | | | |
|---|---|---|---|
| 9,619,436 B2 * | 4/2017 | Lu | G06Q 10/1095 |
| 11,520,974 B2 * | 12/2022 | Sun | G06F 3/0488 |
| 2014/0035949 A1 | 2/2014 | Singh et al. | |
| 2014/0152696 A1 * | 6/2014 | Jung | G06F 3/017 |
| | | | 345/633 |
| 2015/0347987 A1 | 12/2015 | Ali | |
| 2016/0109954 A1 * | 4/2016 | Harris | G06V 20/20 |
| | | | 345/156 |
| 2016/0224657 A1 * | 8/2016 | Mullins | G06F 16/951 |
| 2016/0350812 A1 * | 12/2016 | Priness | G06Q 30/0264 |
| 2017/0287217 A1 * | 10/2017 | Kim | B62J 50/22 |
| 2017/0300634 A1 * | 10/2017 | Chiang | G16H 10/60 |
| 2018/0260785 A1 * | 9/2018 | Bender | G06Q 10/1095 |
| 2018/0330354 A1 * | 11/2018 | Xiu | G06Q 20/3274 |
| 2019/0019022 A1 * | 1/2019 | Marda | G06F 16/93 |
| 2019/0213557 A1 | 7/2019 | Dotan-Cohen et al. | |
| 2020/0201044 A1 * | 6/2020 | Singh | G06F 3/147 |
| 2021/0161621 A1 * | 6/2021 | Salah | A61C 7/002 |
| 2021/0382605 A1 * | 12/2021 | Edwards | G06F 3/04815 |
| 2022/0004286 A1 * | 1/2022 | Alldredge | G06F 9/453 |

* cited by examiner

*Primary Examiner* — Matthew A Eason
*Assistant Examiner* — Sujit Shah
(74) *Attorney, Agent, or Firm* — Fernando & Partners, LLP

(57) ABSTRACT

Various implementations disclosed herein include devices, systems, and methods for augmenting a physical writing surface. In various implementations, a device includes a display, a non-transitory memory and one or more processors coupled with the display and the non-transitory memory. In various implementations, a method includes presenting, via the display, a pass-through representation of a physical writing surface that corresponds to an application installed on the device. In some implementations, the method includes detecting a difference between the physical writing surface and an electronic record stored in association with the application. In some implementations, the method includes overlaying an element on the pass-through representation of the physical writing surface based on the difference between the physical writing surface and the electronic record.

22 Claims, 14 Drawing Sheets

AUGMENTING A PHYSICAL WRITING SURFACE

CROSS-REFERENCE TO RELATED APPLICATION

This application claims the benefit of U.S. Provisional Patent App. No. 63/155,527, filed on Mar. 2, 2021, which is incorporated by reference in its entirety.

TECHNICAL FIELD

The present disclosure generally relates to augmenting a physical writing surface.

BACKGROUND

Some devices are capable of generating and presenting environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
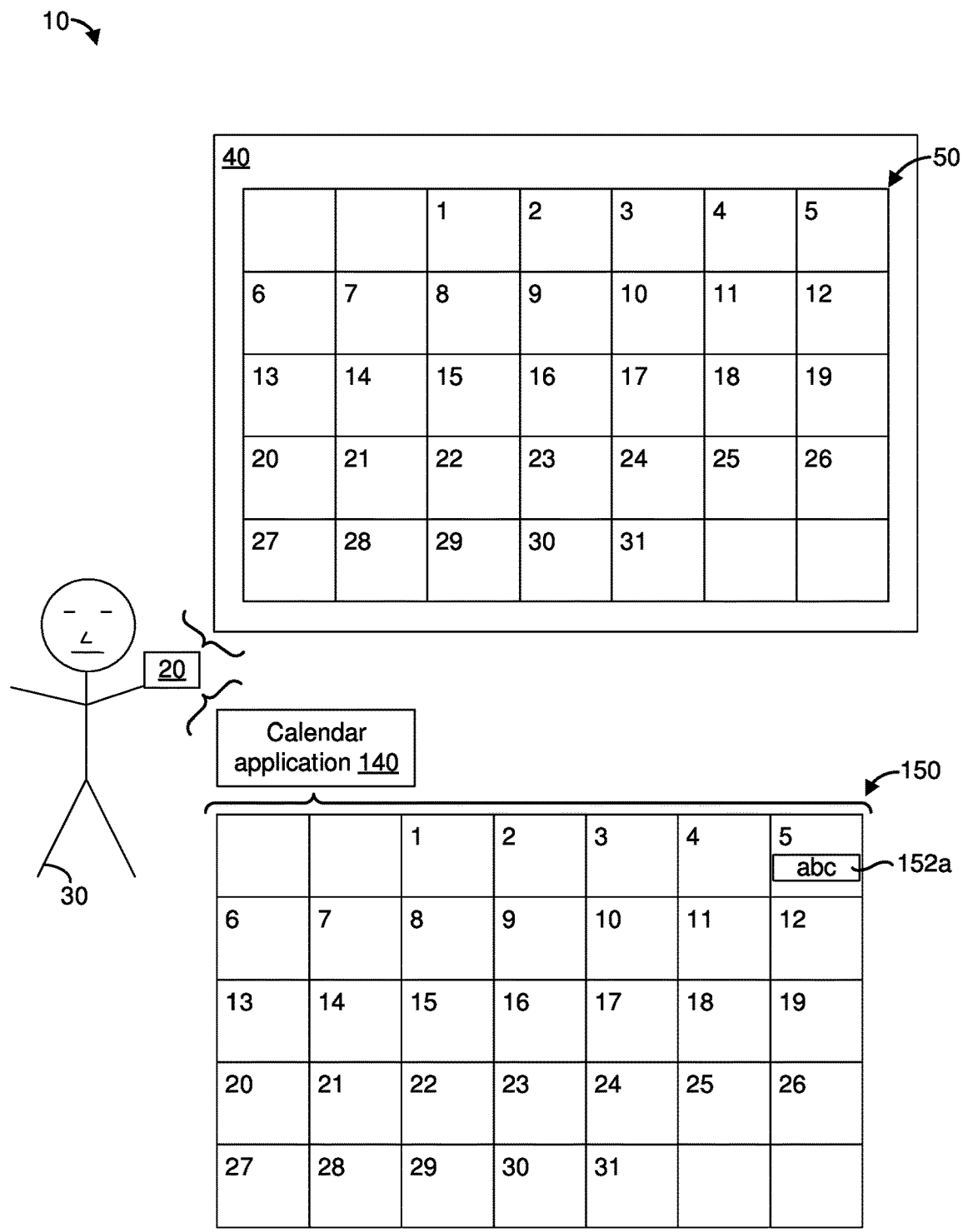
FIGS. 1A-1K are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for augmenting a physical writing surface. In various implementations, a device includes a display, a non-transitory memory and one or more processors coupled with the display and the non-transitory memory. In various implementations, a method includes presenting, via the display, a pass-through representation of a physical writing surface that corresponds to an application installed on the device. In some implementations, the method includes detecting a difference between the physical writing surface and an electronic record stored in association with the application. In some implementations, the method includes overlaying an augmented reality (AR) element on the pass-through representation of the physical writing surface based on the difference between the physical writing surface and the electronic record.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some users use a physical writing surface to maintain physical records and an application to maintain corresponding electronic records. For example, some users use a physical calendar and an electronic calendar to record calendar events. Similarly, some users use a physical notebook or a whiteboard and an electronic note-taking application for notes. Generally, users that maintain physical records and electronic records have to manually ensure that the physical records and the electronic records contain the same information. For example, users that maintain a physical calendar and an electronic calendar have to manually ensure that physical calendar entries on the physical calendar correspond to electronic calendar entries on the electronic calendar. The manual task of ensuring that physical records convey the same information as electronic records is time-consuming. Additionally, while a user compares physical records with electronic records a display of a battery-operated device is kept on, and unnecessarily keeping the display on for extended periods of time causes the battery to drain sooner.

The present disclosure provides methods, devices and/or systems for augmenting a physical writing surface. A device augments a physical writing surface by overlaying an augmented reality (AR) element on a pass-through representation of the physical writing surface based on an electronic record stored in association with an application that corresponds to the physical writing surface.

When a user is viewing a physical writing surface, the device determines whether there is a difference between the physical writing surface and an electronic record stored in association with an application that corresponds to the physical writing surface. If the device determines that there is a difference between the physical writing surface and the electronic record, the device overlays an AR element on a pass-through representation of the physical writing surface, for example, in order to provide an appearance that there is no difference between the physical writing surface and the electronic record. Overlaying the AR element reduces a need for the user to provide user inputs that correspond to navigating to the application. Overlaying the AR element reduces a need for the user to manually make a change to the physical writing surface so that the physical writing surface conveys the same information as the application.

When a user is viewing a physical calendar, the device determines whether there is a difference between the physical calendar and electronic calendar records stored in a calendar application. If the physical calendar is different from the electronic calendar, the device overlays an AR element onto a pass-through representation of the physical calendar in order to provide an appearance that the physical calendar includes the same calendar records as the calendar application. For example, if the calendar application includes an electronic calendar record with no corresponding physical calendar record on the physical calendar, the device overlays an AR calendar record onto a pass-through representation of the physical calendar in order to provide an appearance that the physical calendar includes the corresponding physical calendar record. Overlaying the AR calendar record reduces a need for the user to navigate to the calendar application on the device. Overlaying the AR calendar record also reduces a need for the user to manually create a physical calendar record on the physical calendar.

When a user is viewing a physical note-taking surface (e.g., a physical notebook or a whiteboard), the device determines whether there is a difference between the physical note-taking surface and an electronic note record stored in a note-taking application. If the physical note-taking surface is different from the electronic note record, the device overlays an AR element onto a pass-through representation of the physical note-taking surface in order to provide an appearance that the physical note-taking surface includes the same information as the electronic note record. For example, if the note-taking application includes an electronic note record with no corresponding physical note record on the physical note-taking surface, the device overlays an AR note record onto a pass-through representation of the physical note-taking surface in order to provide an appearance that the physical note-taking surface includes the corresponding physical note record. Overlaying the AR note record reduces a need for the user to navigate to the note-taking application on the device. Overlaying the AR note record also reduces a need for the user to manually create a physical note record on the physical note-taking surface.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20 and a user 30 of the electronic device 20.

In some implementations, the electronic device 20 includes a handheld computing device that can be held by the user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

In some implementations, the electronic device 20 includes an optical see-through display. For example, the electronic device 20 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

In various implementations, the electronic device 20 presents (e.g., displays) an XR environment 40 on a display of the electronic device 20. In some implementations, the XR environment 40 is a pass-through representation of a physical environment surrounding the electronic device 20. For example, the XR environment 40 is a pass-through of the operating environment 10. In some implementations, the pass-through is an optical pass-through in which visible light from the physical environment enters eyes of the user 30. In some implementations, the pass-through is a video pass-through in which the user 30 views a video of the physical environment.

In the example of FIG. 1A, the XR environment 40 includes a pass-through representation 50 of a physical calendar. In some implementations, the physical calendar is made from paper. For example, in some implementations, the physical calendar is a wall calendar that is attached to a wall of the physical environment, a desk calendar that is placed on a desk in the physical environment, or a notebook calendar (e.g., a pocket calendar) that the user 30 carries with him/her. In some implementations, the physical calendar is printed or drawn onto a physical surface such as a whiteboard. In various implementations, the user 30 uses a physical writing implement (e.g., a pen, a pencil, a marker, etc.) to write information regarding events onto the physical calendar.

In some implementations, the electronic device 20 includes a calendar application 140. For example, the calendar application 140 is installed on the electronic device 20. In some implementations, the calendar application 140 includes an electronic calendar 150. In various implementations, the user 30 uses the calendar application 140 to view and/or update the electronic calendar 150. In various implementations, the user 30 uses an input interface of the electronic device 20 to view and/or modify electronic calendar records stored in association with the electronic calendar 150. In the example of FIG. 1A, the electronic calendar 150 stores a first electronic calendar record 152a titled 'abc'. In some implementations, the first electronic calendar record 152a represents a calendar event scheduled for the 5th of the month being shown.

In various implementations, the user 30 uses the physical calendar represented by the pass-through representation 50 and the electronic calendar 150 to track various events. Since the user 30 uses both the physical calendar and the electronic calendar 150, the user 30 has to manually ensure that physical calendar and the electronic calendar 150 convey the same event information. For example, if the user 30 adds a new electronic calendar record to the electronic calendar 150, the user 30 may have to make a corresponding entry on the physical calendar in order to ensure that the physical calendar conveys the same event information as the electronic calendar 150. As such, in order to ensure that the physical calendar conveys the same information as the electronic calendar 150, the user 30 may have to create a physical calendar record for each electronic calendar record in the electronic calendar 150. Similarly, if the user 30 creates a new physical calendar record on the physical calendar, the user 30 may have to make a corresponding electronic entry in the electronic calendar 150 in order to ensure that the electronic calendar 150 conveys the same event information as the physical calendar. As such, in order to ensure that the electronic calendar 150 conveys the same information as the physical calendar, the user 30 may have to manually create an electronic calendar record for each physical calendar record on the physical calendar.

In some implementations, the electronic device 20 detects that there is a difference between event information written on the physical calendar and event information stored in the electronic calendar 150. For example, the electronic device 20 detects that the physical calendar is missing a physical calendar record (e.g., an event entry) that corresponds to the first electronic calendar record 152a. As can be seen in FIG. 1A, the pass-through representation 50 of the physical calendar does not include a physical calendar record that corresponds to (e.g., mimics) the first electronic calendar record 152a. The pass-through representation 50 of the physical calendar may be missing the abc' event entry on the 5th because the user 30 may not have written the 'abc' event entry on the physical calendar.

Figure 1B:
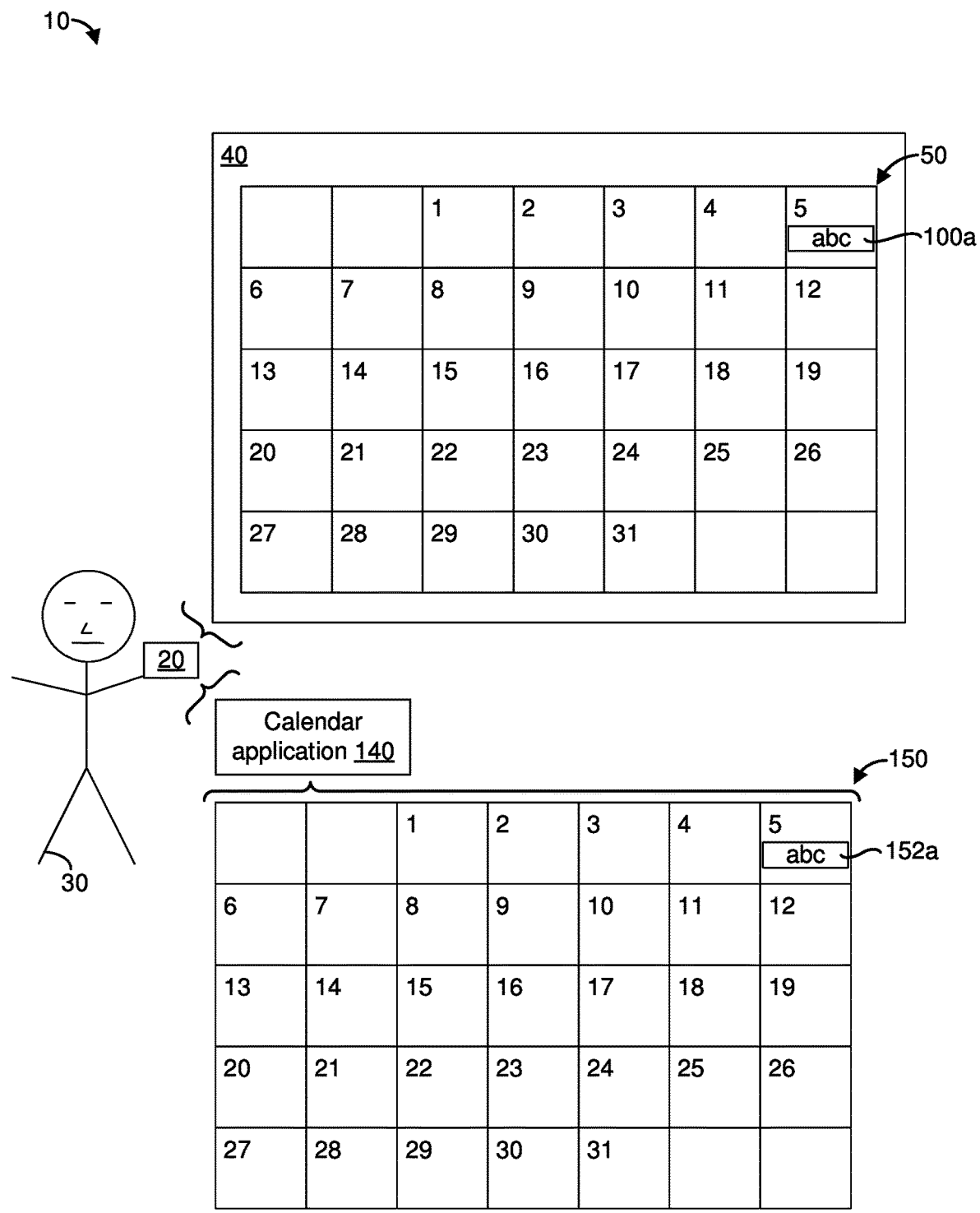

Referring to FIG. 1B, in response to detecting that the physical calendar is missing the 'abc' event entry, the electronic device 20 overlays a first AR element 100a on the pass-through representation 50 of the physical calendar. In some implementations, the first AR element 100a includes AR text and/or an AR graphic. In the example of FIG. 1B, the first AR element 100a includes AR text that reads 'abc'. Overlaying the first AR element 100a onto the pass-through representation 50 of the physical calendar provides an appearance that the physical calendar includes a physical calendar record corresponding to the first electronic calendar record 152a. As such, overlaying the first AR element 100a provides an appearance that the physical calendar provides the same event information as the electronic calendar 150. In some implementations, overlaying the first AR element 100a reduces a need for the user 30) to manually update the physical calendar. For example, overlaying the first AR element 100a reduces a need for the user 30 to manually write 'abc' on the physical calendar. Alternatively or additionally, overlaying the first AR element 100a serves as a reminder for the user 30 to update the physical calendar. For example, overlaying the first AR element 100a serves as a reminder for the user 30 to write 'abc' on the physical calendar. In various implementations, overlaying the first AR element 100a provides an appearance that the physical calendar is synchronized with the electronic calendar 150.

As can be seen in FIG. 1B, the electronic device 20 overlays the first AR element 100a on a portion of the pass-through representation 50 of the physical calendar that corresponds to the 5th day of the month being displayed because the first electronic calendar record 152a is associated with the 5th day of the month. More generally, in various implementations, the electronic device 20 overlays an AR element on a portion of the pass-through representation 50) of the physical calendar that corresponds to a time period associated with a corresponding electronic calendar record.

Figure 1C:
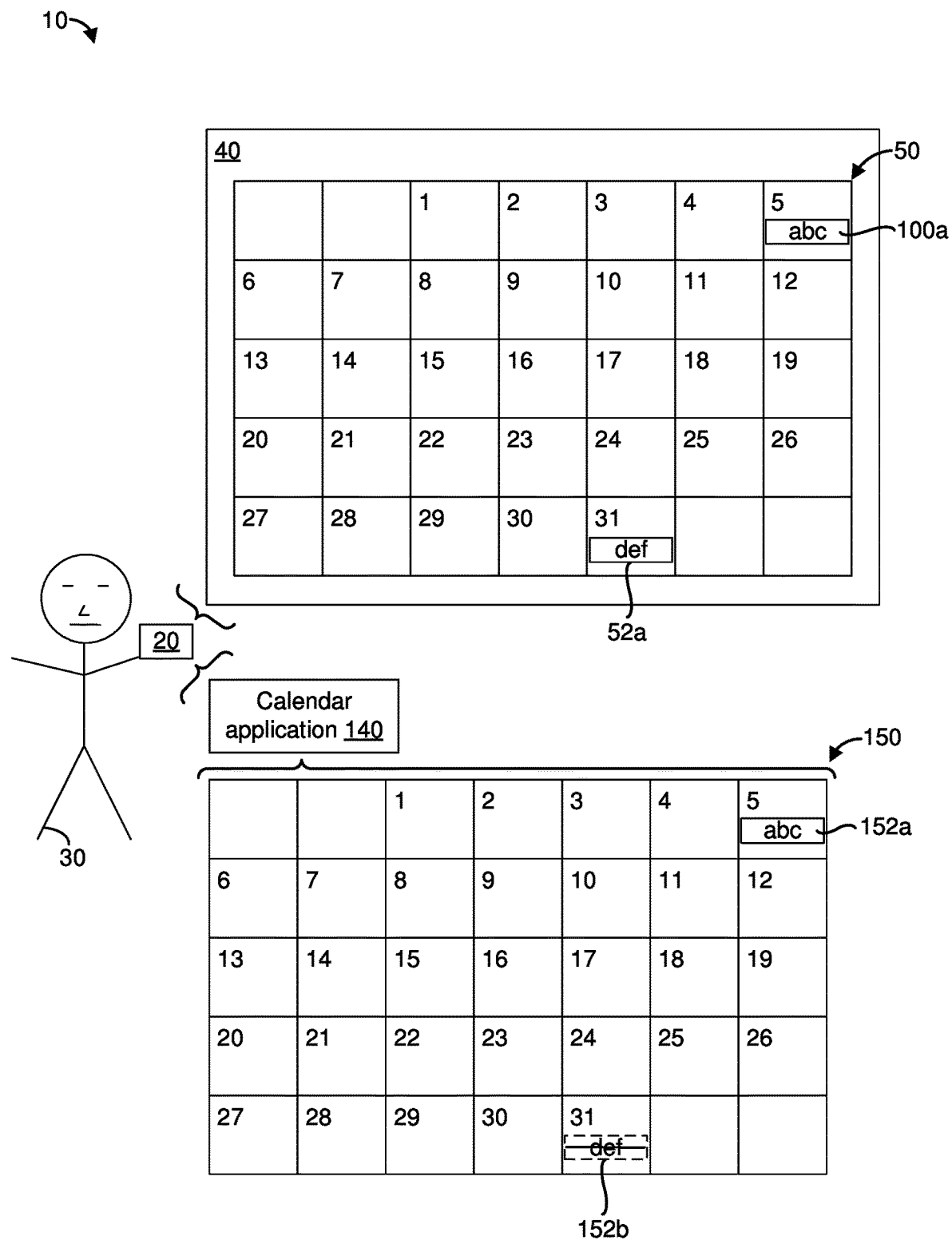
Figure 1D:
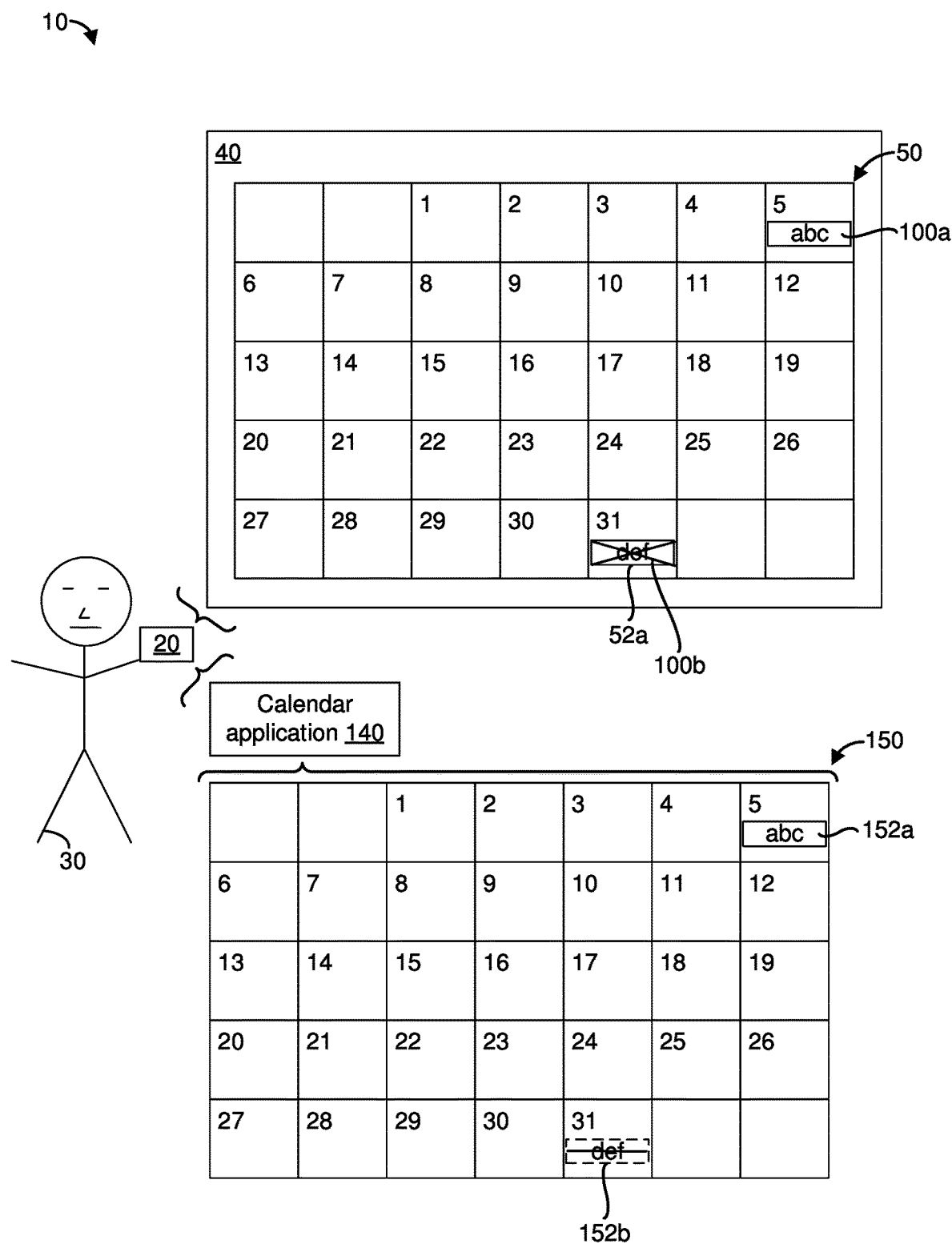
Figure 1E:
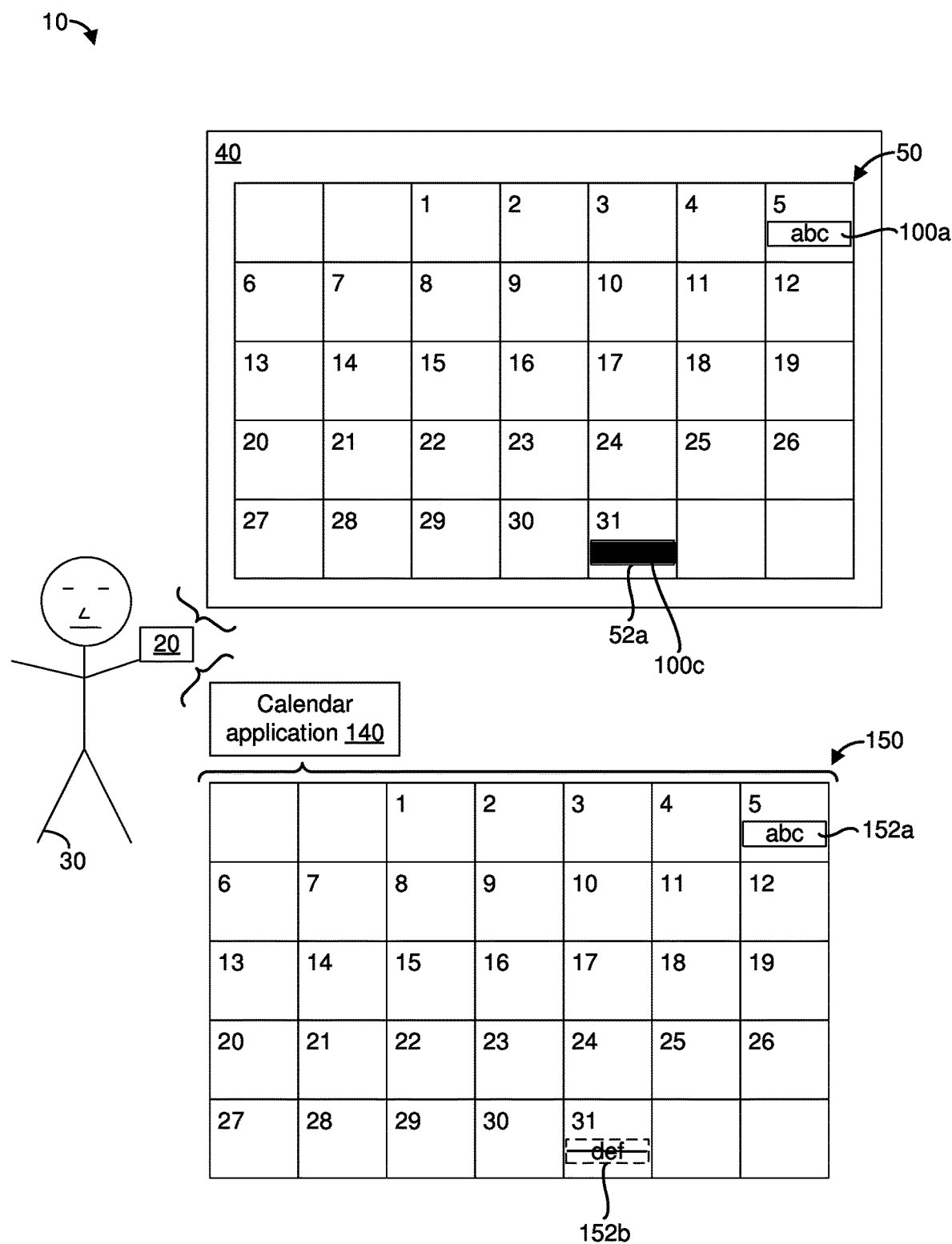

FIGS. 1C-1E illustrate that, in some implementations, the electronic device 20) overlays an AR element on the pass-through representation 50 of the physical calendar in order to compensate for outdated event information or incorrect event information on the physical calendar. In the example of FIG. 1C, the pass-through representation 50 of the physical calendar indicates that the physical calendar includes a first physical calendar record 52*a* titled 'def' on the 31st day of the month being displayed. As illustrated in FIG. 1C, the electronic calendar 150 previously included a second electronic calendar record 152*b* titled 'def' on the 31st day of the month being displayed. However, as indicated by the dashed rectangle around the text 'def' and the strike through the text 'def', the second electronic calendar record 152*b* has been deleted. The user 30 may have deleted the second electronic calendar record 152*b* from the electronic calendar 150 but the user 30 may not have erased or stricken the first physical calendar record 52*a*.

Referring to FIG. 1D, in some implementations, in response to detecting that the second electronic calendar record 152*b* corresponding to the first physical calendar record 52*a* has been deleted, the electronic device 20 overlays a second AR element 100*b* onto the first physical calendar record 52*a* in order to indicate that an event corresponding to the first physical calendar record 52*a* has been canceled. In some implementations, the second AR element 100*b* includes an AR cross that is overlaid on the text 'def' corresponding to the first physical calendar record 52*a*. In some implementations, the second AR element 100*b* includes an AR horizontal line that is overlaid on the text 'def' corresponding to the first physical calendar record 52*a* in order to provide an appearance that the text 'def' has been stricken. In some implementations, the second AR element 100*b* includes a masking element that masks (e.g., covers up) the text 'def' corresponding to the first physical calendar record 52*a* in order to provide an appearance that the text 'def' is not written on the physical calendar.

Overlaying the second AR element 100*b* onto the pass-through representation 50 of the physical calendar provides an appearance that the physical calendar provides the same event information as the electronic calendar 150. In some implementations, overlaying the second AR element 100*b* reduces a need for the user 30 to manually update the physical calendar. For example, overlaying the second AR element 100*b* reduces a need for the user 30 to manually cross-out the text 'def' on the physical calendar. Alternatively or additionally, overlaying the second AR element 100*b* operates as a reminder for the user 30 to update the physical calendar. For example, overlaying the second AR element 100*b* operates as a reminder for the user 30 to cross-out the text 'def' on the physical calendar. In various implementations, overlaying the second AR element 100*b* provides an appearance that the physical calendar is synchronized with the electronic calendar 150.

Referring to FIG. 1E, in some implementations, the electronic device 20 overlays an AR element onto a portion of the pass-through representation 50 of the physical calendar in order to obfuscate (e.g., obscure) a physical calendar record that is outdated or inaccurate. In the example of FIG. 1E, the electronic device 20 overlays a third AR element 100*c* (e.g., an obfuscation element, for example, a black bar) onto the text 'def' corresponding to the first physical calendar record 52*a* in order to obfuscate the first calendar record 52*a* from the user 30. Overlaying an obfuscation element (e.g., the third AR element 100*c*) prevents the electronic device 20 from presenting information (e.g., physical calendar events) that is outdated or inaccurate.

Figure 1F:
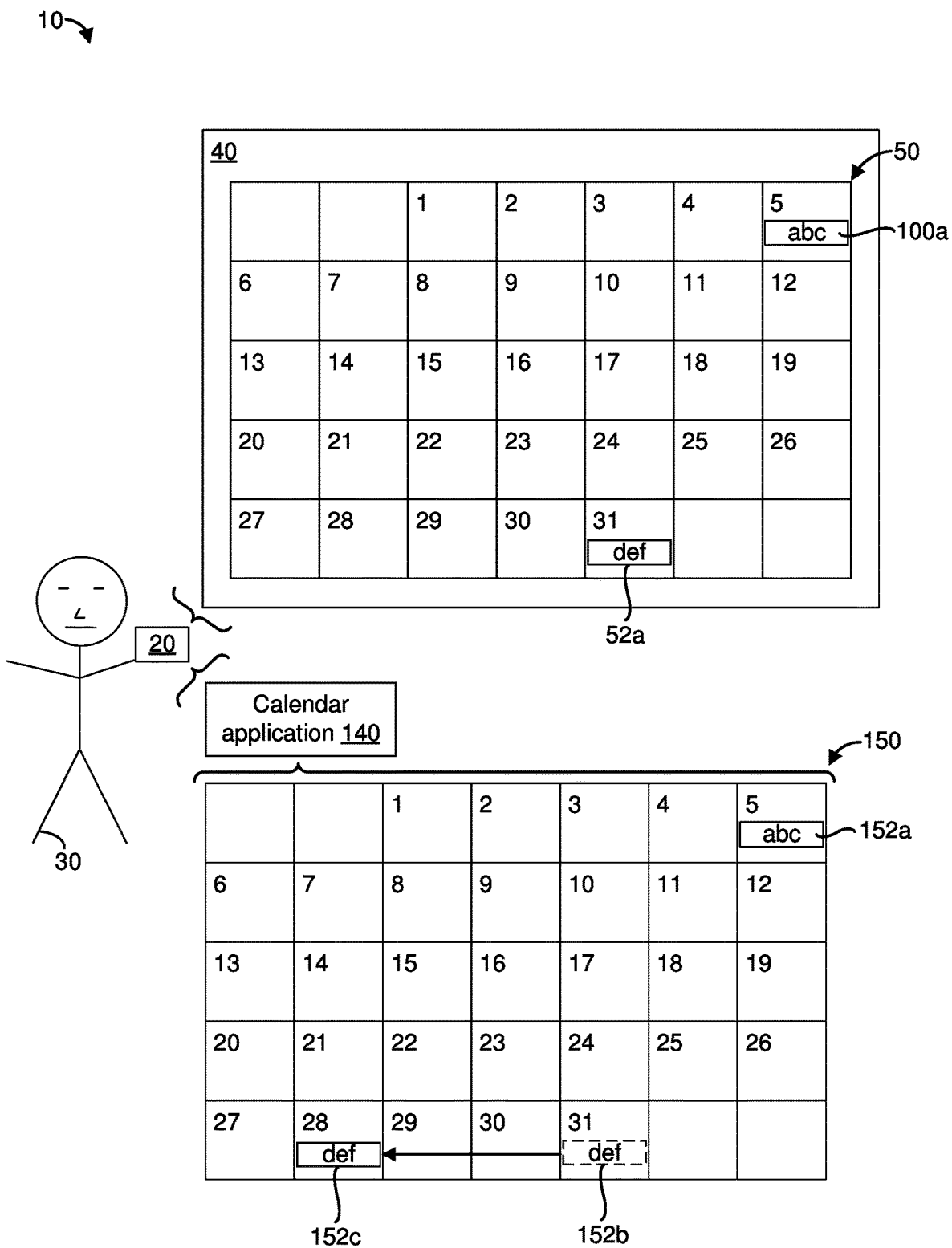
Figure 1G:
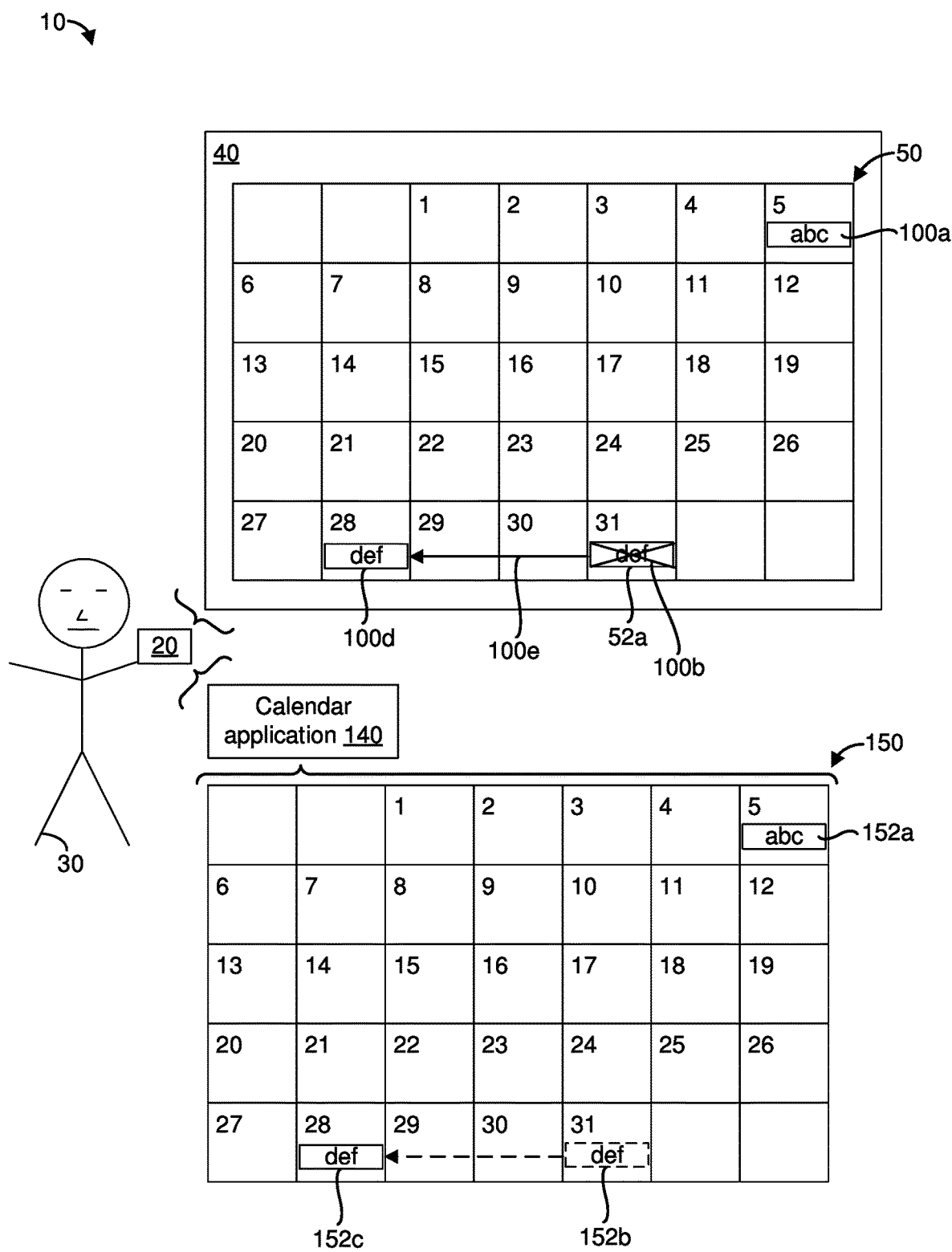

FIGS. 1F and 1G illustrate a sequence in which the electronic device 20 displays multiple AR elements on the pass-through representation 50 of the physical calendar in order to indicate that a calendar event has been moved from a first location on the pass-through representation 50 of the physical calendar corresponding to a first time period to a second location on the pass-through representation 50 of the physical calendar corresponding to a second time period. In the example of FIG. 1F, the second electronic calendar record 152*b* has been moved from the 31st of the month to the 28th of the month resulting in the creation of a third electronic calendar record 152*c*.

As shown in FIG. 1G, in response to detecting that the second electronic calendar record 152*b* has been transformed into the third electronic calendar record 152*c*, the electronic device 20 overlays the second AR element 100*b* onto a portion of the pass-through representation 50 of the physical calendar that corresponds to the first physical calendar record 52*a* in order to indicate that the first physical calendar record 52*a* is no longer valid. Additionally, the electronic device 20 overlays a fifth AR element 100*d* (e.g., AR text) onto a portion of the pass-through representation 50 of the physical calendar that corresponds to the 28th of the month in order to indicate that the 'def' event is scheduled for the 28th of the month. In some implementations, the electronic device 20 overlays a fifth AR element 100*e* (e.g., an AR arrow) to indicate that the 'def' event has been moved from the 31st of the month to the 28th of the month.

In various implementations, overlaying AR elements (e.g., the first AR element 100*a* shown in FIG. 1B, the second AR element 100*b* shown in FIGS. 1D, 1F and 1G, the third AR element 100*c* shown in FIG. 1E, and the fourth AR element 100*d* and the fifth AR element 100*e* shown in FIG. 1G) onto the pass-through representation 50 of the physical calendar reduces a need for the user 30 to provide user inputs that correspond to opening the calendar application 140 in order to verify an accuracy of the physical calendar by comparing physical calendar records on the physical calendar with electronic calendar records stored in association with the electronic calendar 150. Reducing unnecessary user inputs tends to enhance operability of the electronic device 20 by reducing power consumption associated with processing (e.g., obtaining, interpreting and acting upon) user inputs and extending a battery-life of the electronic device 20. Overlaying AR elements and reducing unnecessary user inputs tends to enhance a user experience provided by the electronic device 20.

Figure 1H:
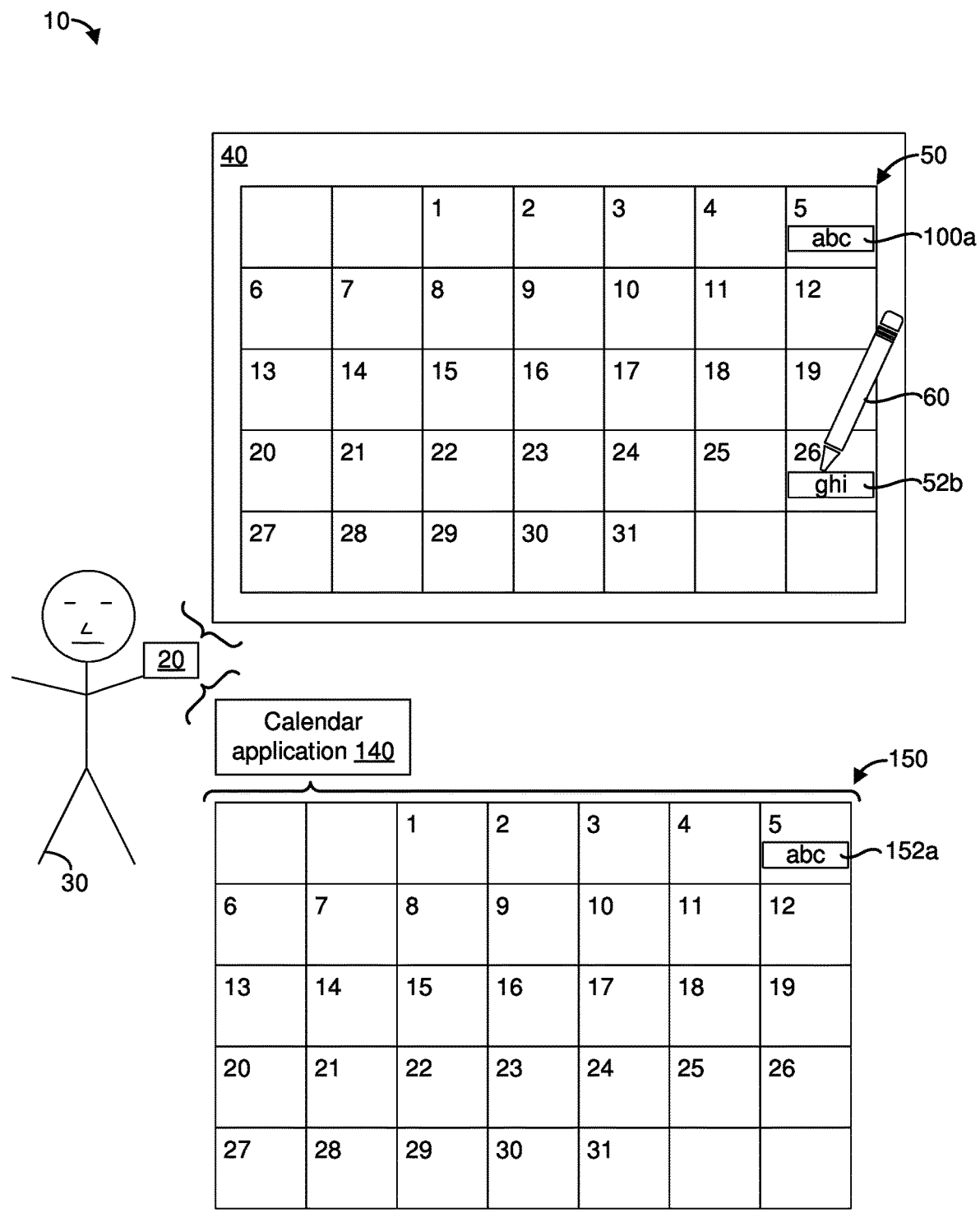
Figure 1I:
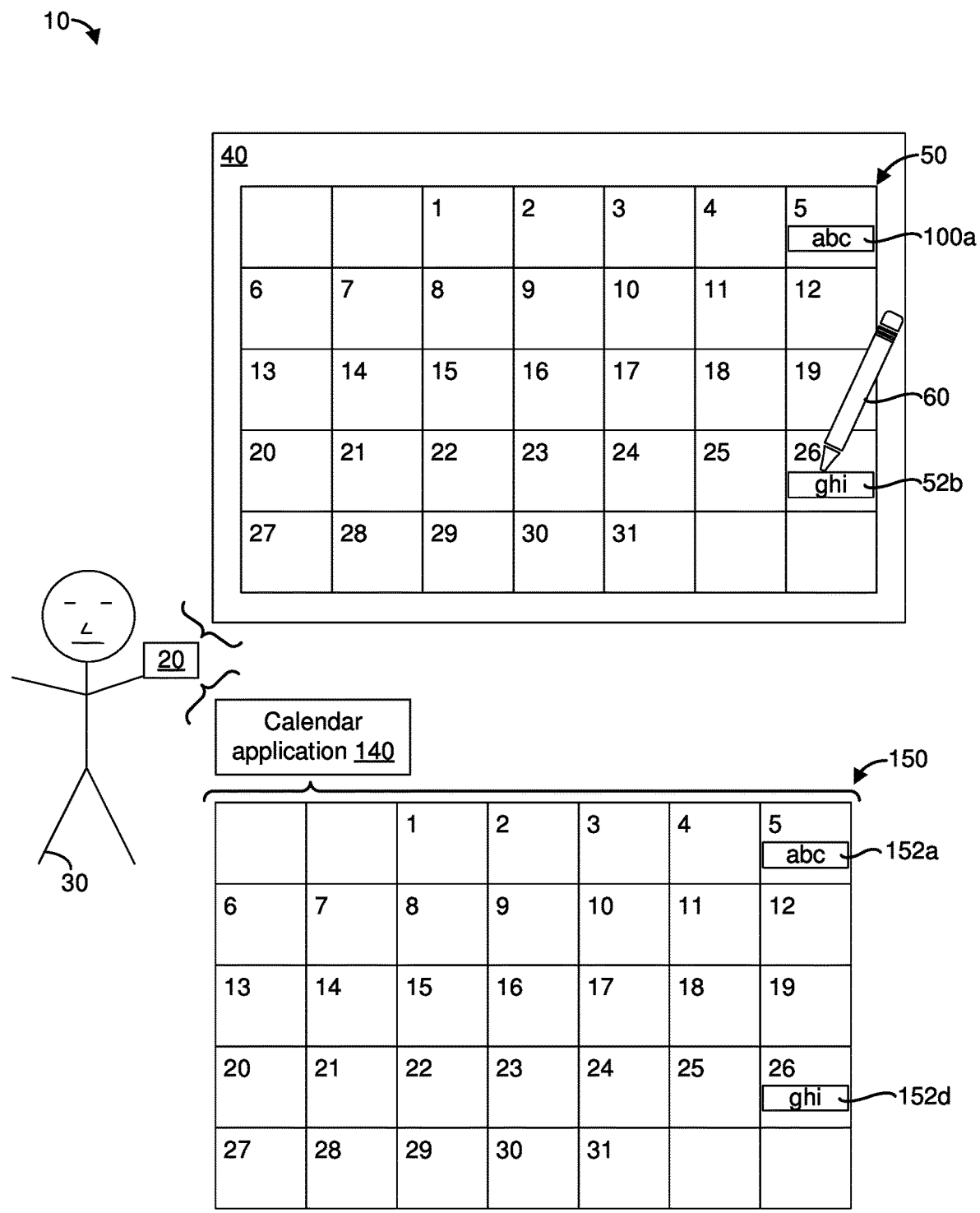

FIGS. 1H and 1I illustrate a sequence in which the electronic device 20 updates the electronic calendar 150 based on detecting physical changes to the physical calendar. In the example of FIG. 1H, the electronic device 20 detects that the user 30 is using a writing instrument 60 (e.g., a pen, a pencil, a marker, etc.) to create a new physical calendar record 52*b* ("second physical calendar record 52*b*", hereinafter) title 'ghi'. As can be seen in FIG. 1H, the electronic calendar 150 does not include an electronic calendar record titled 'ghi' on the 26th day of the month.

Referring to FIG. 1I, in response to detecting the creation of the second physical calendar record 52*b*, the electronic device 20 generates a corresponding new electronic calendar record 152*d* ("fourth electronic calendar record 152*d*, hereinafter). Automatically generating the fourth electronic calendar record 152*d* in response to detecting the creation of the second physical calendar record 52*b* reduces a need for the user 30 to open the calendar application 140 and provide a user input that corresponds to manually creating the fourth electronic calendar record 152*d*.

Figure 1J:
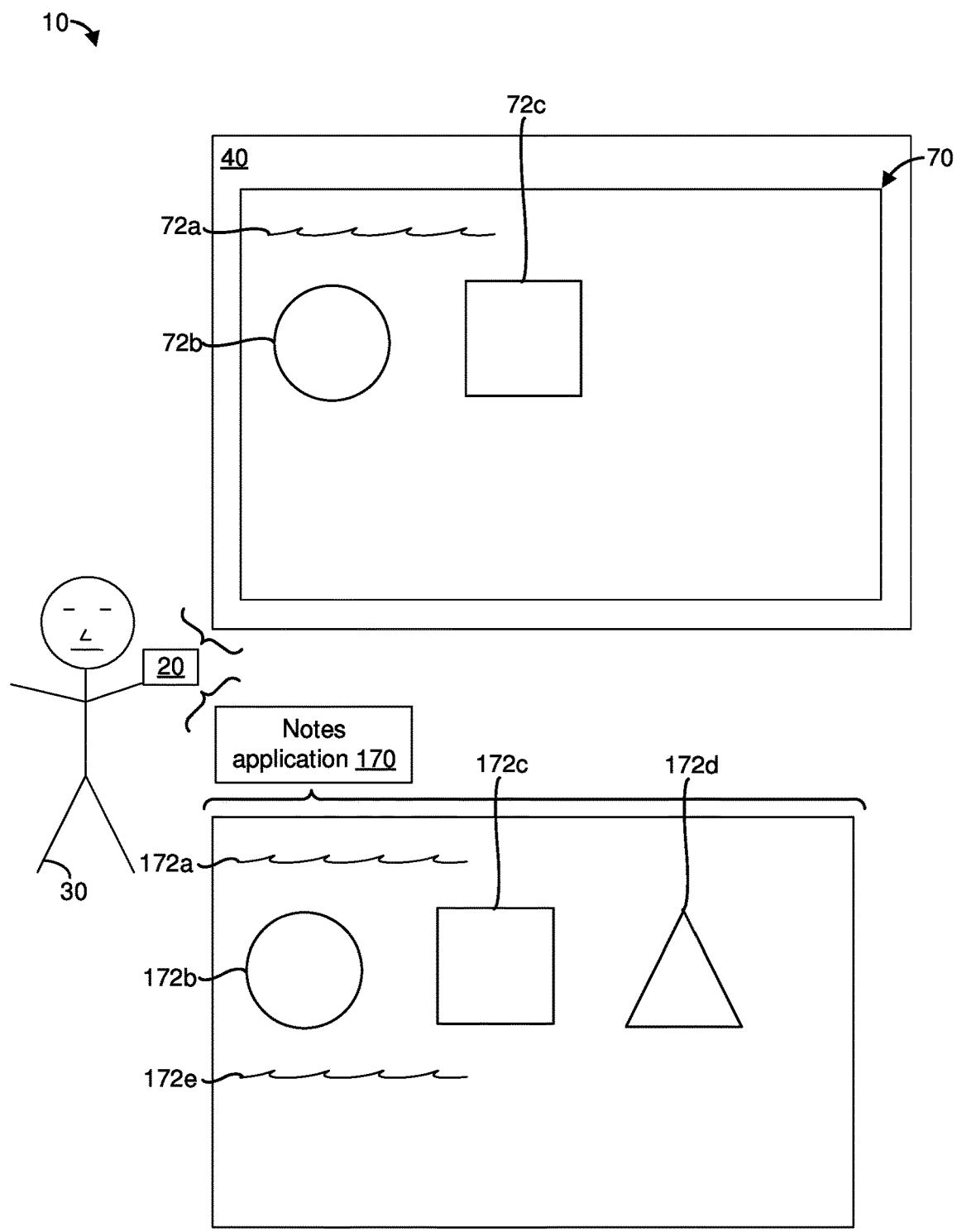

FIG. 1J illustrates a pass-through representation 70 of a physical note-writing surface (e.g., a whiteboard or a physical notebook). As shown in FIG. 1J, the physical note-writing surface includes a first physical record 72*a* (e.g., handwritten text), a second physical record 72*b* (e.g., a hand-drawn shape), and a third physical record 72*c* (e.g., another hand-drawn shape). In some implementations, the user 20 used a writing implement (e.g., a pen, a pencil, a marker, a crayon, etc.) to create (e.g., write or draw) the physical records 72*a*, 72*b* and 72*c* on the physical note-writing surface.

In some implementations, the electronic device 20 includes a notes application 170 that includes various electronic records. In the example of FIG. 1J, the notes application 170 includes a first electronic record 172*a* (e.g., typed text or a scanned version of the handwritten text of the first physical record 72*a*). The notes application 170 further includes a second electronic record 172*b* that corresponds to the second physical record 72*b*, and a third electronic record 172*c* that corresponds to the third physical record 72*c*. In the example of FIG. 1J, the notes application 170 includes a fourth electronic record 172*d* and a fifth electronic record 172*e* that do not correspond to physical records on the physical note-writing surface.

Figure 1K:
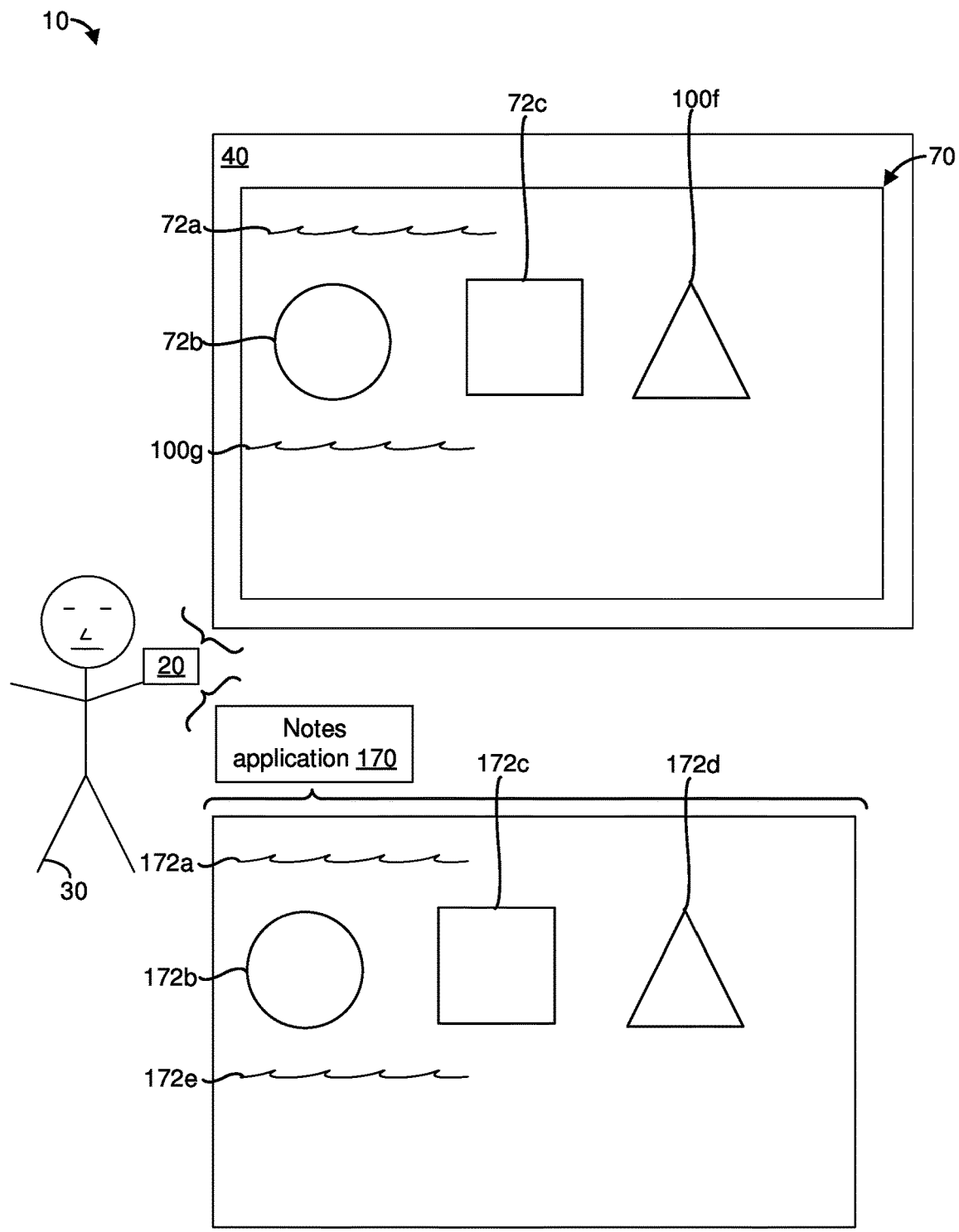

Referring to FIG. 1K, in response to detecting that the physical note-writing surface is missing physical records that correspond to the fourth electronic record 172*d* and the fifth electronic record 172*e*, the electronic device 20 overlays a sixth AR element 100*f* (e.g., an AR drawing that corresponds to the fourth electronic record 172*d*) and a seventh AR element 100*g* (e.g., an AR text that corresponds to the fifth electronic record 172*e*) onto the pass-through representation 70 of the physical note-writing surface. In some implementations, overlaying the sixth AR element 100*f* and the seventh AR element 100*g* reduces a need for the user 30 to manually draw a shape corresponding to the fourth electronic record 172*d* and manually write text corresponding to the fifth electronic record 172*e* on the physical note-writing surface. Alternatively or additionally, in some implementations, overlaying the sixth AR element 100*f* and the seventh AR element 100*g* operate as a reminder for the user 30 to manually draw a shape corresponding to the fourth electronic record 172*d* and manually write text corresponding to the fifth electronic record 172*e* on the physical note-writing surface.

In some implementations, the electronic device 20 detects the creation of a new physical record on the physical note-writing surface, and the electronic device 20 automatically generates a corresponding electronic record in the notes application 170. In some implementations, the electronic device 20 detects new hand-written text on the physical note-writing surface, and the electronic device 20 automatically inserts corresponding text in the notes application 170. As such, the notes application 170 includes an accurate representation of physical records on the physical note-writing surface.

In various implementations, overlaying AR elements (e.g., the sixth AR element 100*f* and the seventh AR element 100*g* shown in FIG. 1K) onto the pass-through representation 70 of the physical note-writing surface reduces a need for the user 30 to provide user inputs that correspond to opening the notes application 170 in order to verify an accuracy of the physical note-writing surface by comparing physical records on the physical note-writing surface with electronic records stored in association with the notes application 170. Reducing unnecessary user inputs tends to enhance operability of the electronic device 20 by reducing power consumption associated with processing (e.g., obtaining, interpreting and acting upon) user inputs and extending a battery-life of the electronic device 20. Overlaying AR elements and reducing unnecessary user inputs tends to enhance a user experience provided by the electronic device 20.

Figure 2:
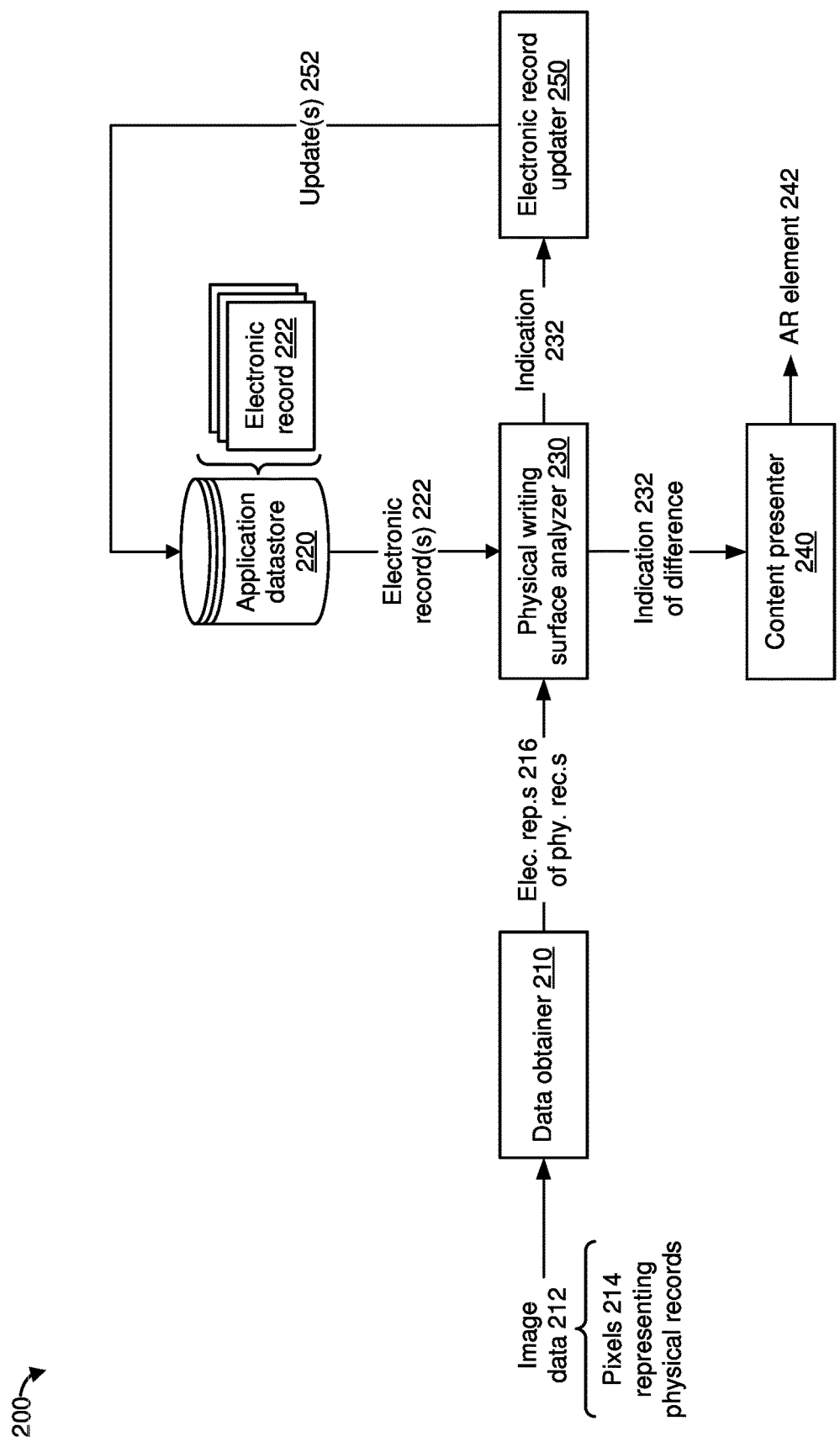
FIG. 2 is a block diagram of a system in accordance with some implementations.

FIG. 2 is a block diagram of an augmentation system 200 ("system 200", hereinafter) in accordance with some implementations. In some implementations, the system 200 resides at (e.g., is implemented by) the electronic device 20 shown in FIGS. 1A-1K. In some implementations, the electronic device 20 (shown in FIGS. 1A-1K) includes the system 200. In various implementations, the system 200 includes a data obtainer 210, an application datastore 220, a physical writing surface analyzer 230, a content presenter 240 and an electronic record updater 250.

In various implementations, the data obtainer 210 obtains image data 212 corresponding to a physical environment (e.g., the operating environment 10 shown in FIGS. 1A-1K). In some implementations, the image data 212 includes a set of one or more images (e.g., a sequence of images as part of a video) that are captured by an image sensor (e.g., a camera) of the electronic device 20 shown in FIGS. 1A-1K. In some implementations, the image data 212 includes pixels 214 that represent a physical writing surface. For example, some of the pixels 214 in the image data 212 correspond to the pass-through representation 50 of the physical calendar shown in FIG. 1A. In some implementations, some of the pixels represent physical records written on or printed on the physical writing surface. For example, some of the pixels 214 in the image data 212 may correspond to the first physical calendar record 52*a* shown in FIG. 1C.

In some implementations, the data obtainer 210 generates electronic representations 216 of physical records that the pixels 214 represent. For example, in some implementations, the data obtainer 210 performs optical character recognition (OCR) on the pixels 214 in order to identify letters and numerals that the pixels 214 represent. As an example, referring to FIG. 1C, the data obtainer 210 performs OCR on a portion of the pass-through representation 50 of the physical calendar that corresponds to the first physical calendar record 52*a* in order to identify the writing 'def'. In various implementations, the data obtainer 210 provides the electronic representations 216 of the physical records to the physical writing surface analyzer 230. In some implementations, the data obtainer 210 provides the electronic representations 216 of the physical records to the electronic record updater 250.

In various implementations, the application datastore 220 stores electronic records 222 that can be viewed and/or modified via an application. In some implementations, the electronic records 222 include electronic calendar records that can be viewed and/or modified via the calendar application 140 shown in FIGS. IA-1I. For example, the electronic records 222 include the first electronic calendar record 152*a* shown in FIGS. 1A and 1B, the second electronic calendar record 152*b* shown in FIGS. ID-1G, the third electronic calendar record 152*c* shown in FIGS. 1F and IG, and the fourth electronic calendar record 152*d* shown in FIG. 1I. In some implementations, the electronic records 222 include electronic note records that can be viewed and/or modified via the notes application 170 shown in FIGS. 1J and 1K. For example, the electronic records 222 includes the electronic records 172*a*, 172*b*, 172*c*, 172*d* and 172*e* shown in FIGS. 1J and 1K.

In various implementations, the physical writing surface analyzer 230 compares the electronic representations 216 of the physical records with the electronic records 222 stored in the application datastore 220 in order to determine whether there is a difference between information written on the physical writing surface and information stored in association with a corresponding application. For example, in some implementations, the physical writing surface analyzer 230 compares electronic representations of physical calendar records with electronic calendar records stored in the application datastore 220 in order to determine whether the physical calendar and the electronic calendar 150 provide the same event information. In some implementations, the physical writing surface analyzer 230 compares electronic representations of physical note records with electronic note records stored in the application datastore 220 in order to determine whether the physical note-writing surface and the notes application 170 provide the same notes.

In some implementations, the physical writing surface analyzer 230 detects a difference between the electronic representations 216 of the physical records and the electronic records 222. For example, in some implementations, the physical writing surface analyzer 230 detects that the electronic representations 216 of the physical records are missing an electronic representation of a physical record that corresponds to an existing electronic record 222. As an example, referring to FIG. IA, the physical writing surface analyzer 230 detects that the physical calendar is missing a physical calendar record that corresponds to the first electronic calendar record 152*a* in the calendar application 140. In some implementations, the physical writing surface analyzer 230 detects that at least one of the electronic representations 216 of the physical records are outdated in comparison to the electronic records 222. As an example, referring to FIG. 1C, the physical writing surface analyzer 230 detects that the first physical calendar record 52*a* is outdated because the corresponding second electronic calendar record 152*b* has been deleted or moved.

In various implementations, the physical writing surface analyzer 230 provides an indication 232 of the difference between the physical writing surface and the corresponding application to the content presenter 240. In various implementations, the content presenter 240 overlays an AR element 242 on a pass-through representation of the physical writing surface. In some implementations, the content presenter 240 generates and overlays the AR element 242 onto the pass-through representation of the physical writing surface in order to provide an appearance that there is no difference between the physical writing surface and the corresponding application.

In some implementations, the AR element 242 includes information that is missing from the physical writing surface. As an example, referring to FIG. 1B, in some implementations, the content presenter 240 overlays the first AR element 100*a* onto the pass-through representation 50 of the physical calendar. In some implementations, the AR element 242 indicates that a physical record on the physical writing surface is outdated. As an example, referring to FIG. ID, the content presenter 240 overlays the second AR element 100*b* in order to indicate that the first physical calendar record 52*a* is outdated (e.g., no longer valid). In some implementations, the AR element 242 includes a set of multiple AR elements that collectively provide an appearance of moving a physical record from one portion of the physical writing surface to another portion of the physical writing surface. As an example, referring to FIG. 1G, the content presenter 240 simultaneously overlays the second AR element 100*b*, the fourth AR element 100*d* and the fifth AR element 100*e* in order to provide an appearance that the first calendar event 52*a* has been re-scheduled from the 31st of the month to the 28th of the month.

In some implementations, the AR element 242 includes text. For example, as shown in FIG. 1B, the first AR element 100*a* includes text. In some implementations, the AR element 242 includes a graphic (e.g., a drawing). For example, as shown in FIG. 1K, the sixth AR element 100*f* includes a drawing. In some implementations, the content presenter 240) utilizes a handwriting style of the user 30 to generate the AR element 242 in order to provide an appearance that the AR element 242 was written by the user 30. For example, in some implementations, a visual characteristic of text in the AR element 242 is within a similarity threshold of a visual characteristic of handwriting of the user 30. As an example, if the user 30 tends to skip dotting the letter 'i' when the user 30 is handwriting, the content presenter 240 generates instances of the letter 'i' in the AR element 242 with no dots. As another example, if the user 30 dots 20% of the instances of the letter 'i' and not the remaining 80%, then 20% of instances of the letter 'i' in the AR element 242 are generated with dots and the remaining 80% are generated without dots.

In some implementations, the physical writing surface analyzer 230 determines whether the electronic records 222 are more recent than the physical records. In some implementations, the physical writing surface analyzer 230 provides the indication 232 of the difference to the content presenter 240) in response to the electronic records 222 being more recent than the physical records. As such, the content presenter 240 overlays the AR element 242 onto the pass-through representation of the physical writing surface in response to the information stored in the corresponding application being more recent than the information written on the physical writing surface.

In some implementations, the physical writing surface analyzer 230 forgoes providing the indication 232 of the difference to the content presenter 240 in response to the physical records being more recent than the electronic records 222. In some implementations, the physical writing surface analyzer 230 provides the indication 232 of the difference to the electronic record updater 250) in response to the physical records being more recent than the electronic records 222. As such, the content presenter 240 forgoes overlaying the AR element 242 onto the pass-through representation of the physical writing surface in response to the information written on the physical writing surface being more recent than the information stored in the corresponding application. In some implementations, the data obtainer 210 obtains the image data 212 regularly (e.g., every time the physical writing surface is in a field-of-view of an image sensor of the electronic device 20), and the physical writing surface analyzer 230 determines a recency of the information on the physical writing surface based on historical images of the physical writing surface obtained by the data obtainer 210.

In various implementations, the electronic record updater 250 generates an update 252 for the application datastore 220 in response to receiving the indication 232 of the difference between the physical records and the electronic records from the physical writing surface analyzer 230. In some implementations, the update 252 includes a new electronic record that corresponds to a physical record that the user 30 handwrote onto the physical writing surface after the electronic records 222 were last updated. As an example, referring to FIG. 1I, in some implementations, electronic record updater 250 generates the fourth electronic calendar record 152*d* and stores the fourth electronic calendar record 152*d* in the application datastore 220 as a new electronic record 222. In some implementations, the update 252 includes a modification to an existing electronic record 222 in response to detecting a handwritten change to a corresponding physical record after the existing electronic record 222 was generated.

Figure 3:
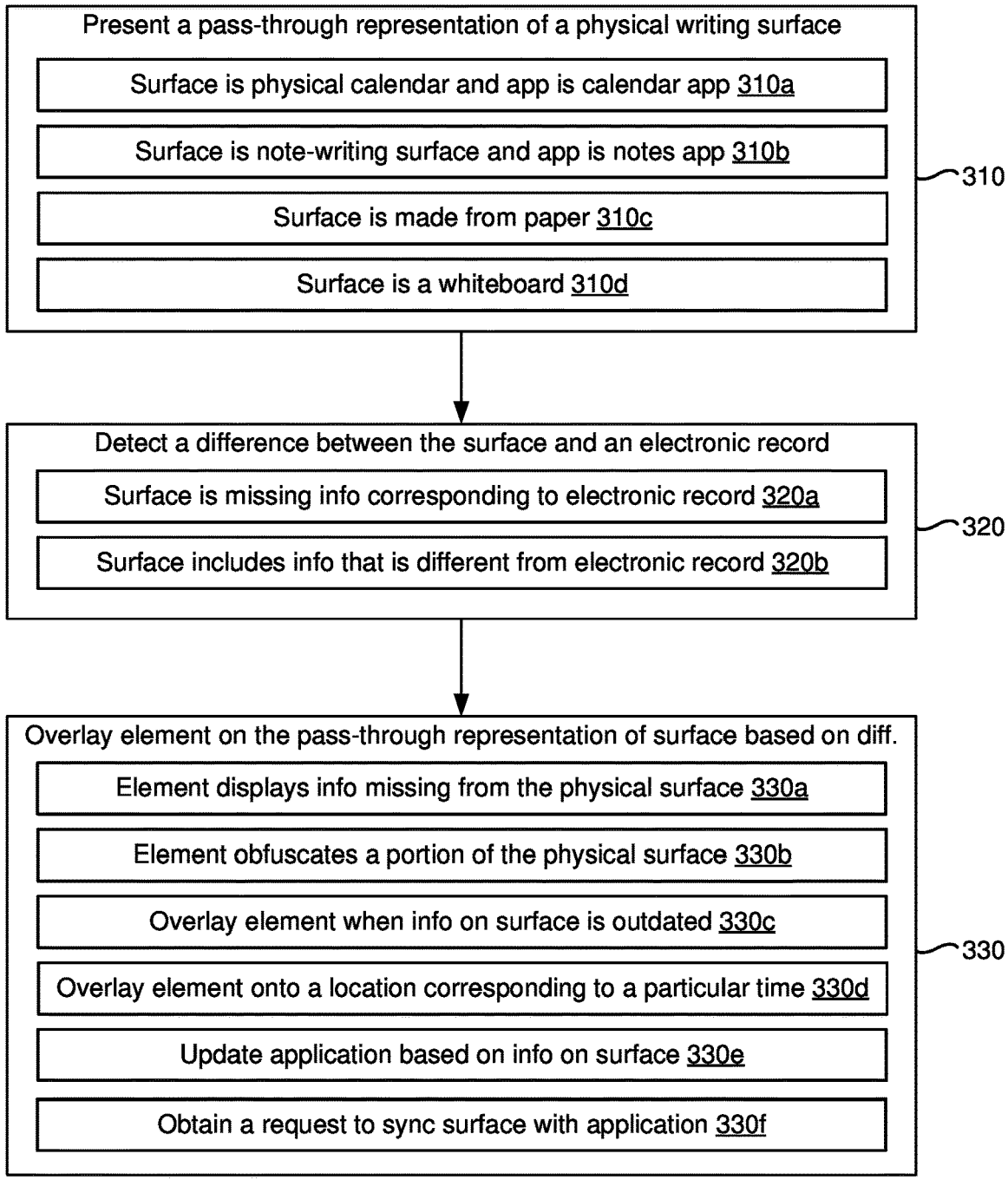
FIG. 3 is a flowchart representation of a method of augmenting a physical writing surface in accordance with some implementations.

FIG. 3 is a flowchart representation of a method 300 of augmenting a physical writing surface. In various implementations, the method 300 is performed by a device including a display, one or more processors and a non-transitory memory (e.g., the electronic device 20 shown in FIGS. 1A-1K, and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes presenting, via the display, a pass-through representation of a physical writing surface that corresponds to an application installed on the device. In some implementations, the pass-through is an optical pass-through. In some implementations, the pass-through is a video pass-through.

As represented by block 310a, in some implementations, the physical writing surface is a physical calendar (e.g., the physical calendar represented by the pass-through representation 50 shown in FIGS. 1A-1I) and the application is a calendar application (e.g., the calendar application 140 shown in FIGS. 1A-1I). In some implementations, the calendar application is installed on the device. In some implementations, the calendar application is a web calendar that is accessible via a browser application.

As represented by block 310b, in some implementations, the physical writing surface is a physical note-writing surface (e.g., the physical note-writing surface represented by the pass-through representation 70 shown in FIGS. 1J and 1K) and the application is a notes application (e.g., the notes application 170 shown in FIGS. 1J and 1K).

As represented by block 310c, in some implementations, the physical writing surface is made from paper. For example, in some implementations, the physical writing surface is a wall calendar, a desk calendar, a notebook calendar, a pocket calendar, a notebook diary, a pocket diary, etc.

As represented by block 310d, in some implementations, the physical writing surface is a whiteboard. For example, in some implementations, the physical writing surface is a blank whiteboard, or a whiteboard with dates written thereon.

As represented by block 320, in some implementations, the method 300 includes detecting a difference between the physical writing surface and an electronic record stored in association with the application. For example, as described in relation to FIG. 2, in some implementations, the physical writing surface analyzer 230 compares the electronic representations 216 of the physical records with the electronic records 222 and detects a difference between the electronic representations 216 of the physical records and the electronic records 222.

As represented by block 320a, in some implementations, detecting the difference includes detecting that the physical writing surface does not have a physical record that corresponds to the electronic record. For example, as described in relation to FIG. 2, in some implementations, the physical writing surface analyzer 230 compares the electronic representations 216 of the physical records with the electronic records 222 and determines that the electronic representations 216 of the physical records are missing an electronic representation of a physical record that corresponds to one of the electronic records 222.

In some implementations, the physical writing surface is a physical calendar and the application is a calendar application, and detecting the difference includes detecting that the physical calendar does not have a physical calendar record that corresponds to an electronic calendar record stored in the calendar application. For example, as described in relation to FIG. 1A, the electronic device 20 (e.g., the system 200, for example, the physical writing surface analyzer 230) determines that the physical calendar is missing a physical calendar record that corresponds to the first electronic calendar record 152a.

In some implementations, the physical writing surface is a physical note-writing surface (e.g., a physical notebook or a physical whiteboard) and the application is a notes application, and detecting the difference includes detecting that the physical note-writing surface does not have a physical note record that corresponds to an electronic note record stored in the notes application. For example, as described in relation to FIG. 1J, the electronic device 20) (e.g., the system 200, for example, the physical writing surface analyzer 230) determines that the physical note-writing surface is missing physical records that correspond to the fourth electronic record 172d and the fifth electronic record 172e.

As represented by block 320b, in some implementations, detecting the difference includes detecting that the physical writing surface includes a physical record that is different from the electronic record. For example, as described in relation to FIG. 2, in some implementations, the physical writing surface analyzer 230 compares the electronic representations 216 of the physical records with the electronic records 222 and determines that the electronic representations 216 of the physical records are different from the electronic records 222.

As represented by block 320b, in some implementations, the physical writing surface is a physical calendar and the application is a calendar application, and detecting the difference includes detecting that the physical calendar has a physical calendar record that is different from an electronic calendar record stored in the calendar application. For example, as shown in FIG. 1F, the electronic device 20 detects that the first physical calendar record 52a is different from the third electronic calendar record 152c because the first physical calendar record 52a is associated with the 31st of the month and the third electronic calendar record 152c is associated with the 28th of the month.

In some implementations, the physical writing surface is a physical note-writing surface (e.g., a physical notebook or a physical whiteboard) and the application is a notes application, and detecting the difference includes detecting that the physical note-writing surface has a physical note record that is different from an electronic note record stored in the notes application.

As represented by block 330, in some implementations, the method 300 includes overlaying an augmented reality (AR) element on the pass-through representation of the physical writing surface based on the difference between the physical writing surface and the electronic record. For example, as shown in FIG. 1B, the electronic device 20 (e.g., the system 200, for example, the content presenter 240) overlays the first AR element 100a in response to detecting that the physical calendar does not include a physical calendar record that corresponds to the first electronic calendar record 152a in the electronic calendar 150.

In some implementations, overlaying the AR element provides an appearance that the physical writing surface is synchronized with the application. In some implementations, overlaying the AR element provides an appearance that there is no difference between the physical writing surface and the electronic records stored in the application. In some implementations, overlaying the AR element reduces a need for the user to provide user inputs that correspond to opening the application in order to visually compare electronic records stored in association with the application and the physical records written or printed on the physical writing surface. Reducing unnecessary user inputs tends to enhance operability of the device by reducing power consumption associated with processing (e.g., obtaining, interpreting and/or acting upon) user inputs and consequently extending a battery-life of the device.

As represented by block 330a, in some implementations, the AR element displays information from the electronic record that is missing from the physical writing surface. For example, as shown in FIG. 1B, the first AR element 100a displays the letters 'abc' that were missing from the physical calendar. In some implementations, displaying the missing information reduces a need for the user to manually write the missing information onto the physical writing surface.

As represented by block 330b, in some implementations, the AR element includes a masking element (e.g., an obfuscation element) that obscures (e.g., conceals from view) a physical record on the physical writing surface that is outdated without requiring the user to erase the outdated physical record. For example, as shown in FIG. IE, the third AR element 100c includes a masking element that obfuscates the first physical calendar record 52a because the first physical calendar record 52a is no longer valid. In some implementations, obscuring outdated information on the physical writing surface reduces a need for the user to open the application and manually verify a currentness of the information on the physical writing surface by comparing the information on the physical writing surface with information stored in the application. In some implementations, the method 300 further includes displaying information from the electronic record over the masking element. Using the masking element to obfuscate outdated information or inaccurate information and displaying current information or accurate information on top of the masking element tends to enhance a readability of the current information or the accurate information.

As represented by block 330c, in some implementations, the method 300 includes determining that the physical record on the physical writing surface is outdated in response to the electronic record being associated with a first time that is after a second time associated with the physical record. For example, as described in relation to FIG. 2, in some implementations, the physical writing surface analyzer 230 generates the indication 232 of difference in response to determining that the electronic records 222 are more recent than the physical records.

As represented by block 330d, in some implementations, the electronic record corresponds to a particular time period (e.g., a particular day or a particular one hour time slot), and overlaying the AR element includes overlaying the AR element onto a portion of the physical writing surface that corresponds to that particular time period. For example, as shown in FIG. 1B, since the first electronic calendar record 152a corresponds to the 5th day of the month, the electronic device 20 overlays the first AR element 100a onto a portion of the pass-through representation 50 of the physical calendar that corresponds to the 5th day of the month.

As represented by block 330e, in some implementations, the method 300 includes detecting a new physical record being added to (e.g., being written on) the physical writing surface, and storing a new electronic record in association with the application in response to detecting the new physical record. In such implementations, the new electronic record stores information provided by the new physical record. As such, in various implementations, the device updates the application in response to detecting changes being made to the physical writing surface. Updating the application based on changes being made to the physical writing surface reduces a need for the user to provide user inputs that correspond to opening the application and manually updating the application.

In some implementations, the physical writing surface is a physical calendar and the application is a calendar application, and storing the new electronic record includes storing a new electronic calendar record in response to detecting a new physical calendar record being added to the physical calendar. For example, as shown in FIG. 1I, the electronic device 20 generates and stores a new electronic calendar record (e.g., the fourth electronic calendar record 152d) in response to detecting the creation of the second physical calendar record 52b.

In some implementations, the physical writing surface is a physical note-writing surface (e.g., a physical notebook or a physical whiteboard) and the application is a notes application, and storing the new electronic record includes storing a new electronic note record in response to detecting a new physical note record being added to the physical note-writing surface.

As represented by block 330f, in some implementations, overlaying the AR element includes obtaining a user request to synchronize the physical writing surface with the application, and overlaying the AR element in response to obtaining the user request. For example, in some implementations, the user requests the device to display AR elements that identify outdated information on the physical writing surface, replace outdated information with up-to-date information, and/or display information that is missing from the physical writing information.

Figure 4:
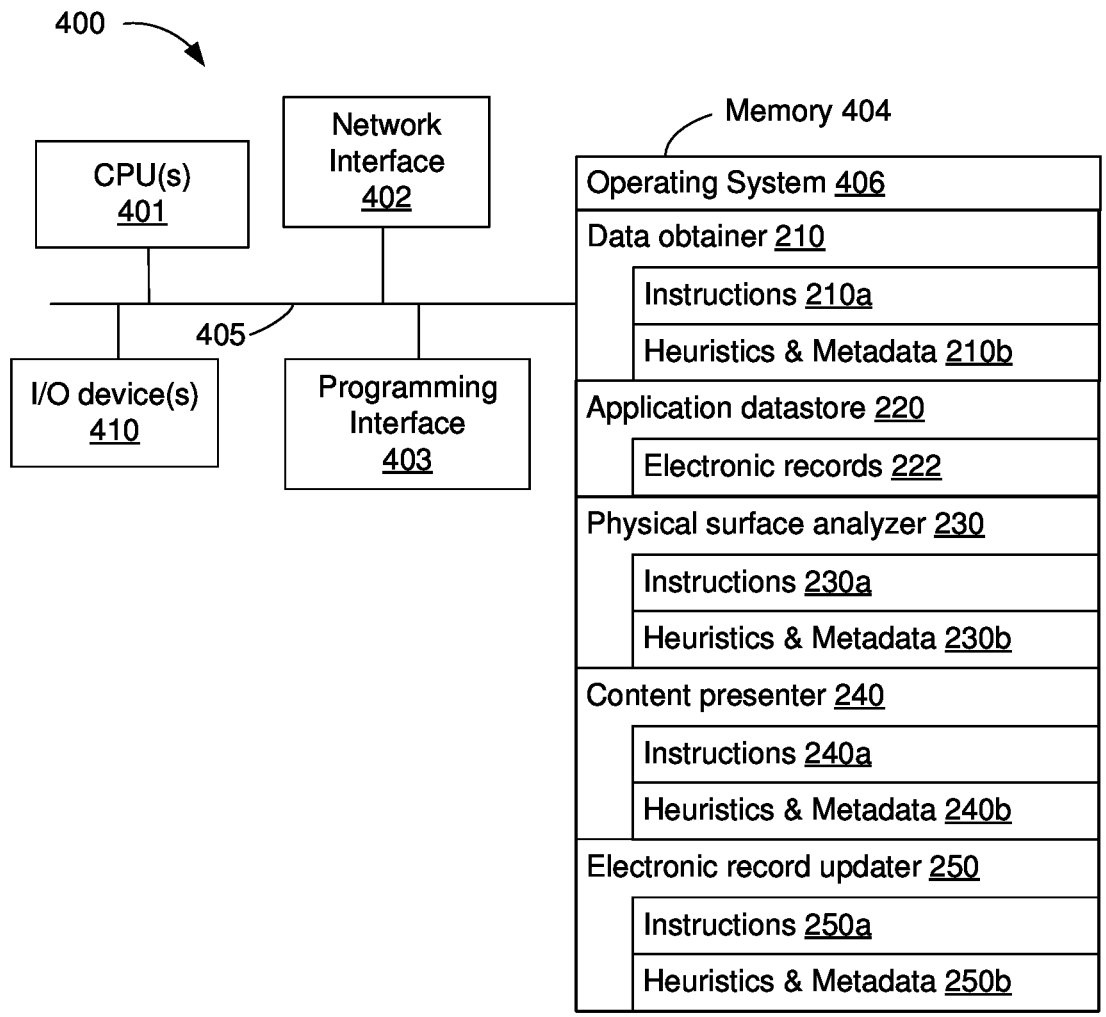
FIG. 4 is a block diagram of a device that augments a physical writing surface in accordance with some implementations.

FIG. 4 is a block diagram of a device 400 that augments a physical writing surface in accordance with some implementations. In some implementations, the device 400 implements the electronic device 20 shown in FIGS. 1A-1K, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the application datastore 220, the physical writing surface analyzer 230, the content presenter 240 and the electronic record updater 250. In various implementations, the device 400 performs the method 300 shown in FIG. 3.

In various implementations, the data obtainer 210 includes instructions 210a, and heuristics and metadata 210b for obtaining image data (e.g., the image data 212 shown in FIG. 2). In various implementations, the physical writing surface analyzer 230 includes instructions 230a, and heuristics and metadata 230b for detecting a difference between the physical writing surface and electronic records stored in association with a corresponding application. In various implementations, the content presenter 240) includes instructions 240a, and heuristics and metadata 240b for presenting a set of one or more AR elements based on the difference detected by the physical writing surface analyzer 230. In various implementations, the electronic record updater 250) includes instructions 250a, and heuristics and metadata 250b for generating an update for the application datastore 220 based on the difference detected by the physical writing surface analyzer 230.

In various implementations, the one or more I/O devices 410 include an image sensor (e.g., a camera) for capturing images (e.g., the image data 212 shown in FIG. 2). In some implementations, the one or more I/O devices 410 include a depth sensor (e.g., a depth camera) to capture the depth data. In some implementations, the one or more I/O devices 410 include a display for displaying an XR environment (e.g., the XR environment 40 shown in FIGS. 1A-1K) and AR elements (e.g., the AR elements 100a, 100b, 100c, 100d, 100e, 100f and 242 shown in FIGS. 1A-2). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, a non-transitory memory and one or more processors coupled with the display and the non-transitory memory:
        presenting, via the display, a pass-through representation of a physical writing surface that corresponds to an application installed on the device;
        detecting a difference between the physical writing surface and an electronic calendar record stored in association with the application;
        determining, based on the difference, whether information written on the physical writing surface corresponds to the electronic calendar record being moved from a first time period to a second time period via the application, wherein the first time period is different from the second time period; and
        in response to determining that the information written on the physical writing surface corresponds to the electronic calendar record being moved from the first time period to the second time period, overlaying a plurality of augmented reality (AR) elements on the pass-through representation of the physical writing surface to indicate that the information has been moved from a first location on the pass-through representation of the physical writing surface corresponding to the first time period to a second location on the pass-through representation of the physical writing surface corresponding to the second time period different from the first time period.

2. The method of claim 1, wherein detecting the difference comprises:
    detecting that the physical writing surface does not have a physical record that corresponds to the electronic calendar record.

3. The method of claim 1, wherein the physical writing surface is a physical calendar and the application is a calendar application; and
    wherein detecting the difference comprises detecting that the physical calendar does not have a physical calendar record that corresponds to an electronic calendar record stored in the calendar application.

4. The method of claim 1, wherein the physical writing surface is a physical note-writing surface and the application is a notes application; and
    wherein detecting the difference comprises detecting that the physical note-writing surface does not have a physical note record that corresponds to an electronic note record stored in the notes application.

5. The method of claim 1, wherein detecting the difference comprises:
    detecting that the physical writing surface includes a physical record that is different from the electronic calendar record.

6. The method of claim 1, wherein the physical writing surface is a physical calendar and the application is a calendar application; and
    wherein detecting the difference comprises detecting that the physical calendar has a physical calendar record that is different from an electronic calendar record stored in the calendar application.

7. The method of claim 1, wherein the physical writing surface is a physical note-writing surface and the application is a notes application; and
    wherein detecting the difference comprises detecting that the physical note-writing surface has a physical note record that is different from an electronic note record stored in the notes application.

8. The method of claim 1, wherein the AR element displays information from the electronic calendar record that is missing from the physical writing surface.

9. The method of claim 1, wherein the AR element includes a masking element that obscures a physical record on the physical writing surface that is outdated.

10. The method of claim 9, further comprising displaying information from the electronic calendar record over the masking element.

11. The method of claim 1, further comprising determining that the electronic calendar record is associated with a first time that is after a second time associated with the physical record.

12. The method of claim 1, wherein the electronic calendar record corresponds to a particular time; and
    wherein overlaying the AR element comprises overlaying the AR element onto a portion of the physical writing surface that corresponds to that particular time.

13. The method of claim 1, wherein overlaying the AR element comprises:
    obtaining a user request to synchronize the physical writing surface with the application; and
    overlaying the AR element in response to obtaining the user request.

14. The method of claim 1, further comprising:
    detecting a new physical record being added to the physical writing surface; and
    storing a new electronic calendar record in association with the application in response to detecting the new physical record, wherein the new electronic calendar record stores information provided by the new physical record.

15. The method of claim 14, wherein the physical writing surface is a physical calendar and the application is a calendar application; and
    wherein storing the new electronic calendar record comprises storing a new electronic calendar record in response to detecting a new physical calendar record being added to the physical calendar.

16. The method of claim 14, wherein the physical writing surface is a physical note-writing surface and the application is a notes application; and
    wherein storing the new electronic calendar record comprises storing a new electronic note record in response to detecting a new physical note record being added to the physical note-writing surface.

17. The method of claim 1, wherein the physical writing surface is a physical calendar and the application is a calendar application.

18. The method of claim 1, wherein the physical writing surface is a physical note-writing surface and the application is a notes application.

19. A non-transitory memory storing one or more programs, which, when executed by one or more processors of a device, cause the device to:
    present, via a display, a pass-through representation of a physical writing surface that corresponds to an application installed on the device;
    detect a difference between the physical writing surface and an electronic calendar record stored in association with the application;
    determine, based on the difference, whether information written on the physical writing surface corresponds to the electronic calendar record being moved from a first time period to a second time period via the application, wherein the first time period is different from the second time period; and in response to determining that the information written on the physical writing surface corresponds to the electronic calendar record being moved from the first time period to the second time period, overlay a plurality of augmented reality (AR) elements on the pass-through representation of the physical writing surface to indicate that the information has been moved from a first location on the pass-through representation of the physical writing surface corresponding to the first time period to a second location on the pass-through representation of the physical writing surface corresponding to the second time period different from the first time period.

20. A device comprising:

one or more processors;

a non-transitory memory;

a display; and one or more programs stored in the non-transitory memory, which, when executed by the one or more processors, cause the device to:

present, via the display, a pass-through representation of a physical writing surface that corresponds to an application installed on the device;

detect a difference between the physical writing surface and an electronic calendar record stored in association with the application;

determine, based on the difference, whether information written on the physical writing surface corresponds to the electronic calendar record being moved from a first time period to a second time period via the application, wherein the first time period is different from the second time period; and in response to determining that the information written on the physical writing surface corresponds to the electronic calendar record being moved from the first time period to the second time period, overlay a plurality of augmented reality (AR) elements on the pass-through representation of the physical writing surface to indicate that the information has been moved from a first location on the pass-through representation of the physical writing surface corresponding to the first time period to a second location on the pass-through representation of the physical writing surface corresponding to the second time period different from the first time period.

21. The method of claim 1, further comprising:

in response to determining that the information written on the physical writing surface is more recent than the information stored in the electronic calendar record, forgo overlaying the AR element on the pass-through representation of the physical writing surface.

22. The method of claim 1, further comprising:

capturing, via a camera, images of the physical writing surface at different times; and determining a recency of the information written on the physical writing surface based on the images of the physical writing surface.

\* \* \* \* \*